US008051112B2

(12) United States Patent
Evanitsky

(10) Patent No.: US 8,051,112 B2
(45) Date of Patent: Nov. 1, 2011

(54) APPARATUS AND METHOD FOR PROVIDING ONLINE CONTENT SERVICE FOR PRODUCT WARRANTIES

(75) Inventor: Eugene S. Evanitsky, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 354 days.

(21) Appl. No.: 12/107,261

(22) Filed: Apr. 22, 2008

(65) Prior Publication Data
US 2009/0265365 A1 Oct. 22, 2009

(51) Int. Cl.
G06F 12/00 (2006.01)
G06F 17/30 (2006.01)
G06F 7/00 (2006.01)
G06F 17/00 (2006.01)

(52) U.S. Cl. .......................... 707/821; 707/609; 707/705
(58) Field of Classification Search .................. 707/661, 707/821, 609, 705
See application file for complete search history.

(56) References Cited

U.S. PATENT DOCUMENTS

| 5,031,223 | A | * | 7/1991 | Rosenbaum et al. | 382/101 |
| 7,381,481 | B2 | * | 6/2008 | Nagai | 428/830 |
| 2001/0053980 | A1 | * | 12/2001 | Suliman et al. | 705/1 |
| 2002/0172335 | A1 | * | 11/2002 | Narasimhan et al. | 379/106.02 |
| 2003/0033271 | A1 | * | 2/2003 | Hendricks | 707/1 |
| 2004/0039493 | A1 | * | 2/2004 | Kaufman | 701/1 |
| 2004/0088313 | A1 | * | 5/2004 | Torres | 707/101 |
| 2004/0158816 | A1 | * | 8/2004 | Pandipati et al. | 717/120 |
| 2007/0061223 | A1 | * | 3/2007 | Rodriguez et al. | 705/26 |

* cited by examiner

Primary Examiner — Charles Lu
(74) Attorney, Agent, or Firm — Fay Sharpe LLP

(57) ABSTRACT

A data-processing system including an information inputting device for inputting one or more information; a transmitting/receiving device for transmitting/receiving the one or more information; and a processing device for processing the one or more information, the processing device including: an image processing module; a data extraction module; a data storage device; and a data tracking module; wherein the data tracking module is in operable communication with a user of the information inputting device to allow the user to organize the one or more information.

18 Claims, 2 Drawing Sheets

APPARATUS AND METHOD FOR PROVIDING ONLINE CONTENT SERVICE FOR PRODUCT WARRANTIES

TECHNICAL FIELD

The present disclosure relates to a data-processing system and method, and, more specifically, to a system and method for organizing a plurality of documents, such as product warranties.

BACKGROUND

In general, consumers purchase products with warranties. A warranty is an obligation that an article or service sold is as factually stated or legally implied by the seller, and that often provides for a specific remedy such as repair or replacement in the event the article or service fails to meet the warranty. However, it is very difficult to find the warranties or any other information related to the warranties when the product actually fails due to the fact that such papers are easily lost or misplaced by the consumer. As a result, many consumers cannot take advantage of warranties that may still be in effect when a failure of a product occurs.

Typically most consumers store product warranties in shoeboxes that are discarded in closets, basements or attics where they may be forgotten or even accidentally destroyed. Moreover, some consumers may use a document scanning pen to scan, store, and transfer product warranty information onto a computer. However, these computer files may be accidentally deleted or forgotten. In addition, even though handheld scanners may be a convenient way to get printed text into an editable format on a computer, the best devices are prohibitively expensive and cumbersome to use.

Consequently, none of these methods has eliminated the inconvenience of losing one or more warranty information that many products come with, which may promise repair or replacement for months or years, or life of the product. Therefore, it would be highly desirable to provide a data-processing system and method that provides for and enables an efficient and reliable warranty document organizer.

SUMMARY

A data-processing system including: an information inputting device for inputting one or more information; a transmitting/receiving device for transmitting/receiving the one or more information; and a processing device for processing the one or more information, the processing device including: an image processing module; a data extraction module; a data storage device; and a data tracking module; wherein the data tracking module is in operable communication with a user of the information inputting device to allow the user to organize the one or more information.

A method for organizing a plurality of documents, the method including: receiving one or more information via an information inputting device; transmitting/receiving the one or more information via a transmitting/receiving device; and processing the one or more information via a processing device, the processing device including: an image processing module; a data extraction module; a data storage device; and a data tracking module; wherein the data tracking module is in operable communication with a user of the information inputting device to allow the user to organize the one or more information.

A computer-readable medium storing a set of programmable instructions configured for being executed by at least one processor for performing a method for organizing a plurality of documents, including: receiving one or more information via an information inputting device; transmitting/receiving the one or more information via a transmitting/receiving device; and processing the one or more information via a processing device, the processing device including: an image processing module; a data extraction module; a data storage device; and a data tracking module; wherein the data tracking module is in operable communication with a user of the information inputting device to allow the user to organize the one or more information.

BRIEF DESCRIPTION OF THE DRAWINGS

These and other advantages will become more apparent from the following detailed description of the various embodiments of the present disclosure with reference to the drawings wherein.

DETAILED DESCRIPTION

The exemplary embodiments of the present disclosure pertain to a service that is designed for home users. The exemplary embodiments provide a system and method for consumers to file their product warranty information by scanning a warranty card and a sales receipt, and sending such information to the service. The service automatically extracts key information and creates a data record of the purchase. Access to the service can be accomplished through a Xerox® Personal Services (XPS) website. XPS already has online, hosted servers as well as the software to process the images and extract data. The exemplary embodiments of the present disclosure are designed to run as a service, such as SaaS (Software as a Service). SaaS is a software application delivery model where a software vendor develops a web-native software application and hosts and operates (either independently or through a third-party) the application for use by its customers over the Internet. Customers do not pay for owning the software itself but rather for using the service. That is, the customers may pay a periodic fee (e.g., monthly, annually, etc.) for the right to use the software through an application programming interface (API) accessible over the Internet.

Therefore, in the event that a product has a problem, a user can access his or her folder on the XPS website and find his or her product and warranty information. The consumer is told if the product is still under warranty and can then have access to user manuals, tech support sites, and phone numbers. The service can also provide lists of repairmen/repairwomen in the user's vicinity if the product is out of warranty. Consequently, this solution combines a number of existing electronic capabilities to make personal product warranty management less expensive, more accurate and efficient. These features and aspects will become better understood with regard to the following description of the exemplary embodiments.

Figure 1:
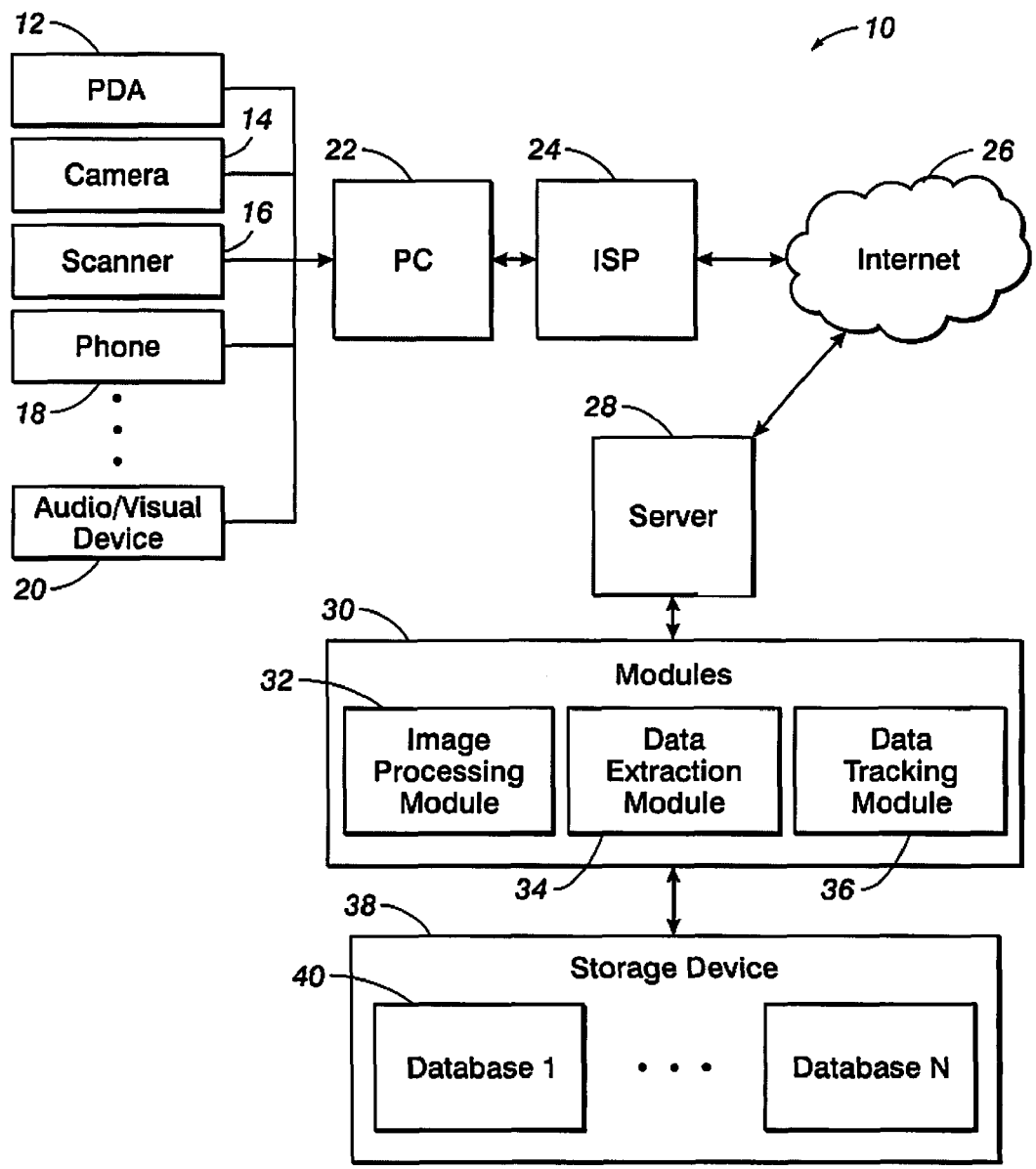
FIG. 1 illustrates a document organizing system in accordance with the exemplary embodiments of the present disclosure.

FIG. 1 illustrates a document organizing system in accordance with the exemplary embodiments of the present disclosure. The system 10 includes a personal digital assistant (PDA) 12, a camera 14, a scanner 16, a phone 18, an audio/visual device 20, a personal computer (PC) 22, an Internet Service Provider (ISP) 24, an Internet 26, a server 28, one or more modules 30, an image processing module 32, a data extraction module 34, a data tracking module 36, a storage device 38, and a database 40.

The PDA 12, the camera 14, the scanner 16, the phone 18, and the audio/visual device 20 illustrate methods of inputting scanned information, and specifically images, into the PC 22. This is not an exhaustive list, but merely an illustrative list of devices that may be used to obtain, scan, and transfer images to a desired destination. It is contemplated that any type of input device may be used to transfer images to a desired destination.

The PC 22 may communicate with a server 28, e.g., through an Internet 26 via an ISP 24. The PC 22 includes an Internet browser application that may connect to a local ISP 24. The ISP 24 may be any business or organization that provides consumers or businesses access to the Internet 26 and related Internet services.

The server 28 is a remote server for performing services for connected clients. The remote server 28 is can be located at a Xerox® facility. The server 28 is in operable communication with the one or more modules 30. In the exemplary embodiments of the present disclosure there are three modules. These include the image processing module 32, the data extraction module 34, and the data tracking module 36. However, a number of other modules may be contemplated to provide similar services and capabilities.

The image processing module 32 uses Optical Character Recognition (OCR) to process the images inputted to the PC 22 via the input devices. The OCR is a mechanical or electronic translation of images of handwritten, typewritten or printed text (usually captured by a scanner) into machine-editable text.

The data extraction module 34 is used for extracting desired data from the images processed by the image processing module 32 via the OCR. When the images are scanned, they go through an OCR process and then through the data extraction process where such images are stored as metadata. The data to be extracted may be pre-programmed by software or may be manually performed by the user or by an XPS technician. Furthermore, many software packages such as Indicius®, Brainware®, XRCE Categorizer, etc., that are used to look for and extract data from unstructured documents need to be "trained" with sample sets. However, in the exemplary embodiments, the XPS service will have already been "trained" with warranty documents and receipt identification capabilities.

The data tracking module 36 is used for tracking and monitoring the desired data extracted by the data extraction module 34. The data tracking module 36 permits the associated links to be discovered and all of the data that is to be reviewed by the customer for accuracy. The customer can then perform any changes that are necessary to the data that is being tracked and monitored by the data tracking module 36.

Once the images and data are processed by the one or more modules 30, the images and/or data are stored in the storage device 38. The storage device 38 may contain one or more databases 40. The data stored in the database 40 may contain the images and/or the following metadata. From the customer profile, the database may contain consumer name and address information. From the image of the warranty card, the database may contain manufacturer, product name, Universal Product Code (UPC) code (if available), and product model number and serial number information. From the image of the sales receipt, the database may contain date of purchase, merchant name and address, and warranty period information.

In addition, the following information can be automatically determined by the system: manufacturer Uniform Resource Locator (URL), warranty contact number, URL to product support, and URL to product user manuals.

Moreover, all metadata that is extracted or discovered is presented to the consumer for verification to assure accuracy. In addition, content management type software can be used to trigger events based on expiration dates. In other words, the consumer can be informed during predetermined time intervals that the warranty information is about to expire and offer the consumer the option to purchase further extended warranties.

Figure 2:
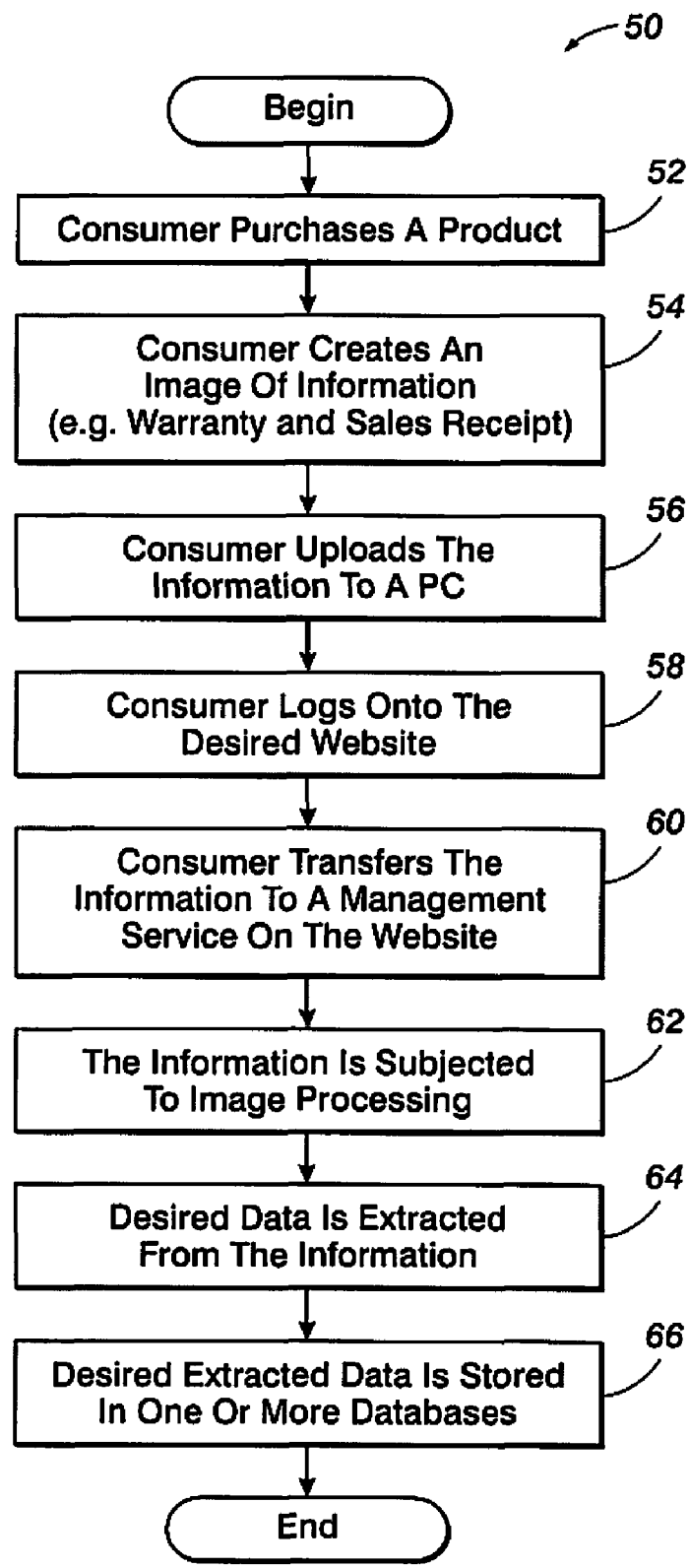
FIG. 2 illustrates a document organizing flow-diagram in accordance with the exemplary embodiments of the present disclosure.

FIG. 2 illustrates a document organizing flow-diagram in accordance with the exemplary embodiments of the present disclosure. The method 50 includes the following steps. In step 52, the consumer purchases a product. In step 54, the consumer creates an image of information (e.g., the warranty and sales receipt). In step 56, the consumer uploads the information to personal computer. In step 58, the consumer logs onto the desired web site (e.g., a Xerox® website including XPS capabilities) in order to upload the information. In embodiments, access to the desired web site may be managed by an authentication module (not explicitly shown) employing a suitable authentication application (e.g., username and password, account number, key words, a challenge response test, CAPTCHA, etc.). In step 60, the consumer transfers information to a management service on the web site. In step 62, the information is subjected to image processing. In step 64, the desired data is extracted from the information processed by the image processing module. In step 66, the desired extracted data is stored in one or more databases of a storage device.

The flow-diagram described in FIG. 2 allows the consumer to access data located in a remote server and stored in one or more databases in order to update, access, verify, and/or modify information, as the consumer desires. In embodiments, consumers may access other document services offered by the XPS service. That is, a consumer may be provided access (e.g., as a paying customer) to multiple document services offered by the XPS service through a single website or one or more related websites. Other user functions that are available to the end-user include: automatically registering the product and sending a confirmation message, sending an alert (email message) one month (can be changed by user profile or on a product by product basis) before the warranty expires, sending an alert message that contains a link for an extended warranty offer if appropriate, sending alerts if there is a safety recall of the item, and allowing users to view, print or email copies of the images at any time desirable.

Therefore, the XPS, is a service that provides for a warranty document organizer that accepts or creates digital images of unstructured warranty documents. The service sorts, categorizes and extracts data from the images using "trained" technology. XPS warranty document organizer stores the images, metadata, and categorized data for the end user. Key data that is extracted includes product model number, serial number, purchase date and price, name of seller, warranty period and contact information. The service discovers other pertinent links and also generates notices when the warranty is about to expire. In addition, users can securely access their data on line from the XPS hosted server. Consequently, this solution combines a number of existing electronic capabilities to make personal product warranty management less expensive, more accurate, and efficient.

In addition, SaaS is generally associated with business software and provides a low cost alternative for businesses to obtain the same benefits of commercially licensed, internally operated software without the associated complexity and high initial cost. As a result, the SaaS software provides for network-based access to, and management of, commercially available software, such as described in the exemplary embodiments of the present disclosure. SaaS also enables activities that are managed from central locations, e.g., Xerox® facilities, rather than at each customer's site, thus enabling customers to access applications remotely via the Internet. Furthermore, SaaS provides for centralized feature updating, which obviates the need for downloadable patches and upgrades. Therefore, SaaS applications enable the exemplary embodiments to provide services for both individual users, as well as small businesses.

Benefits of the embodiments of the present disclosure, for the consumer, include, but are not limited to: a warranty registration service by merely scanning in the registration card and sales receipt, easy access to warranty data, model numbers, user manuals, etc. that are usually lost or misplaced, easier method to locate model and serial numbers, notification capabilities for when warranty is about to expire, and prevention of warranty loss due to lost documentation. Therefore, in the event that the product has a problem, the user can access his or her folder on the XPS website and find his or her product information. The consumer is told if the product is still under warranty and can then have access to user manuals, tech support sites, and phone numbers. The service can also provide lists of repairmen in the user's vicinity if the product is out of warranty.

Benefits of the embodiments of the present disclosure, for the service provider, e.g., Xerox® Corporation, include but are not limited to: providing the infrastructure necessary to create this service and implementing this service via the Internet or other network, such as LAN, WAN, Intranet, and Ethernet.

It will be appreciated that variations of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims. The claims can encompass embodiments in hardware, software, or combinations thereof.

What is claimed is:

1. A data-processing system comprising:
   a computing device configured to capture and communicate at least one image of a product warranty card to a computer that receives and transmits the at least one image; and
   a server in communication with the computer and being configured to process the at least one image, the server including:
      an image processing module configured to process data from the at least one image;
      a data extraction module that automatically extracts specific processed data from the at least one image, the specific processed data including manufacturer, product name, Universal Product Code (UPC), and product model number and serial number;
      a data storage device configured to store the specific processed data as metadata to the image;
      automatically collecting information related to a service provider using the extracted metadata, the information related to a service provider including manufacturer Uniform Resource Locator (URL), warranty contact number, URL to product support and URL to product user manuals using the extracted metadata;
      a data tracking module configured to monitor a warranty status of the product warranty using values associated with the extracted metadata; and,
      providing the warranty status using results of the monitored extracted data and the service provider information, the providing the warranty status including informing a user if the product is still under warranty and providing access to user manuals, tech support sites, and phone numbers, and providing to the user a list of repairmen in a user-vicinity if the product warranty is expired;
   wherein the data tracking module is in operable communication with a user of the computing device and is configured to receive user corrections of inaccuracies corresponding to the warranty card, and to organize the specific processed data and the at least one image, the data tracking module configured to generate at least one notification to the user prior to expiration of the product warranty, the at least one notification including the user manuals, the tech support sites, and the phone numbers, and including a link to enable the user to extend the product warranty.

2. The data-processing system according to claim 1, wherein the image processing module utilizes optical character recognition to process the at least one image.

3. The data-processing system according to claim 1, wherein the data tracking module tracks the metadata and provides user access, user verification, and user modification using the metadata.

4. The data-processing system according to claim 1, wherein the data tracking module automatically sends one or more notifications to the user during predetermined time intervals.

5. The data-processing system according to claim 1, wherein the data tracking module automatically sends one or more notifications to the user for subsequent modification of pre-existing data.

6. The data-processing system according to claim 5, wherein the pre-existing data includes a product warranty expiration.

7. The data-processing system according to claim 1, wherein the data tracking module automatically sends one or more notifications to the user concerning safety recalls.

8. A method for organizing a plurality of documents related to product warranties, the method comprising:
   capturing and communicating, using a computing device, at least one image of a product warranty card to a computer that receives and transmits the at least one image;
   processing, using a server in communication with the computer, the at least one image;
   processing, using an image processing module, data from the at least one image;
   automatically extracting, using a data extraction module, specific processed data from the at least one image, the specific processed data including manufacturer, product name, Universal Product Code (UPC), and product model number and serial number;
   storing, using a data storage device, the specific processed data as metadata to the image;
   automatically collecting information related to a service provider using the extracted metadata, the information related to a service provider including a manufacturer Uniform Resource Locator (URL), warranty contact number, URL to product support and URL to product user manuals using the extracted metadata;

monitoring, using a data tracking module, a warranty status of the product warranty using values associated with the extracted metadata;

providing the warranty status using results of the monitored extracted data and the service provider information, the providing of the warranty status including informing the user if the product is still under warranty and providing access to user manuals, tech support sites, and phone numbers, and providing to the user a list of repairmen in a user-vicinity if the product warranty is expired;

receiving, using the data tracking module in operable communication with a user of the computing device, user corrections of inaccuracies corresponding to the warranty card, and organizing the specific processed data and the at least one image;

generating, using the data tracking module, at least one notification to the user prior to expiration of the product warranty, the at least one notification including the user manuals, the tech support sites, and the phone numbers, and including a link to enable the user to extend the product warranty.

9. The method according to claim 8, wherein the information inputting device is a computer.

10. The method according to claim 8, wherein the processing device is a remote server.

11. The method according to claim 8, wherein the image processing module processes any and all of the information inputted as images.

12. The method according to claim 8, wherein the data extraction module automatically extracts one or more desired data from the inputted images.

13. The method according to claim 12, wherein the data tracking module tracks the one or more desired data and uses the tracked data to provide user access, user verification, and user modification.

14. The method according to claim 8, wherein the data tracking module automatically sends one or more notifications to the user during predetermined time intervals.

15. The method according to claim 8, wherein the data tracking module automatically sends one or more notifications to the user for subsequent modification of pre-existing data.

16. The method according to claim 15, wherein the pre-existing data includes a product warranty expiration.

17. The method according to claim 8, wherein the data tracking module automatically sends one or more notifications to the user concerning safety recalls.

18. The method according to claim 8, wherein the link is a web-based link to a website.

* * * * *